(12) United States Patent
Malakapalli et al.

(10) Patent No.: US 8,201,218 B2
(45) Date of Patent: Jun. 12, 2012

(54) STRATEGIES FOR SECURELY APPLYING CONNECTION POLICIES VIA A GATEWAY

(75) Inventors: Meher P. Malakapalli, Sammamish, WA (US); Donghang Guo, Blacksburg, VA (US); Gautam Swaminathan, Redmond, WA (US); Ido Ben-Shachar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/680,518

(22) Filed: Feb. 28, 2007

(65) Prior Publication Data

US 2008/0209538 A1 Aug. 28, 2008

(51) Int. Cl.
*H04L 29/06* (2006.01)

(52) U.S. Cl. ............... 726/3; 726/1; 726/2; 726/29

(58) Field of Classification Search ............ 726/1, 2, 726/3, 29
See application file for complete search history.

(56) References Cited

U.S. PATENT DOCUMENTS

| | | | |
|---|---|---|---|
| 5,220,674 A | 6/1993 | Morgan et al. | |
| 5,682,478 A | 10/1997 | Watson et al. | |
| 5,764,887 A | 6/1998 | Kells et al. | |
| 5,790,853 A | 8/1998 | Nomura et al. | |
| 5,815,574 A * | 9/1998 | Fortinsky | 713/153 |
| 5,884,046 A | 3/1999 | Antonov | |
| 5,949,975 A | 9/1999 | Batty et al. | |
| 6,049,828 A | 4/2000 | Dev et al. | |
| 6,154,787 A | 11/2000 | Urevig et al. | |
| 6,167,445 A | 12/2000 | Gai et al. | |
| 6,310,889 B1 | 10/2001 | Parsons et al. | |
| 6,452,692 B1 | 9/2002 | Yacoub | |
| 6,463,459 B1 | 10/2002 | Orr et al. | |
| 6,470,384 B1 | 10/2002 | O'Brien et al. | |
| 6,473,794 B1 | 10/2002 | Guheen et al. | |
| 6,510,523 B1 | 1/2003 | Perlman et al. | |
| 6,519,571 B1 | 2/2003 | Guheen et al. | |

(Continued)

FOREIGN PATENT DOCUMENTS

WO  W02007075846 A2  7/2007

OTHER PUBLICATIONS

Rouse, "Managing Terminal Services with Group Policy," retreived on Oct. 3, 2007 at <<http://www.msterminalservices.org/articles/Managing-Terminal-Services-Group-Policy.html>>, Mar. 15, 2007, 11 pgs.

(Continued)

*Primary Examiner* — Edan Orgad
*Assistant Examiner* — Bradley Holder
(74) *Attorney, Agent, or Firm* — Lee & Hayes, PLLC

(57) ABSTRACT

A strategy is described for securely applying connection policies in a system that includes a first entity (e.g., a TS client) connected to a second entity (e.g., a TS server) via a gateway using a remote-operating protocol (e.g., RDP). The strategy involves establishing a first secure channel between the gateway and the TS server and transmitting policy information from the gateway to the TS server. The strategy then involves deactivating the first secure channel and setting up a second secure channel between the TS client and the TS server. The strategy uses the second secure channel to transmit RDP data from the TS client to the TS server. The TS server uses the previously-transmitted policy information to determine whether to enable or disable a feature that affects the TS client, such as device redirection.

15 Claims, 7 Drawing Sheets

U.S. PATENT DOCUMENTS

| | | | |
|---|---|---|---|
| 6,536,037 B1 | 3/2003 | Guheen et al. | |
| 6,552,813 B2 | 4/2003 | Yacoub | |
| 6,571,245 B2 | 5/2003 | Huang et al. | |
| 6,615,166 B1 | 9/2003 | Guheen et al. | |
| 6,675,198 B1 | 1/2004 | Hagiwara et al. | |
| 6,721,713 B1 | 4/2004 | Guheen et al. | |
| 6,816,905 B1 | 11/2004 | Sheets et al. | |
| 6,836,786 B1 | 12/2004 | Zoller et al. | |
| 6,854,016 B1 | 2/2005 | Kraenzel et al. | |
| 6,915,345 B1 | 7/2005 | Tummala et al. | |
| 6,922,724 B1 | 7/2005 | Freeman et al. | |
| 6,954,930 B2 | 10/2005 | Drake et al. | |
| 6,957,186 B1 | 10/2005 | Guheen et al. | |
| 6,970,902 B1 | 11/2005 | Moon | |
| 6,973,482 B2 | 12/2005 | Mohammed et al. | |
| 6,976,262 B1 | 12/2005 | Davis et al. | |
| 6,999,912 B2 | 2/2006 | Loisey et al. | |
| 7,080,404 B2 * | 7/2006 | Abdo et al. | 726/3 |
| 7,111,060 B2 * | 9/2006 | Araujo et al. | 709/224 |
| 7,130,891 B2 | 10/2006 | Bernardin et al. | |
| 7,149,698 B2 | 12/2006 | Guheen et al. | |
| 7,165,041 B1 | 1/2007 | Guheen et al. | |
| 7,257,613 B2 | 8/2007 | Boudnik et al. | |
| 7,269,580 B2 | 9/2007 | Matichuk | |
| 7,299,274 B2 | 11/2007 | Rajarajan et al. | |
| 7,330,872 B2 * | 2/2008 | Peart et al. | 709/203 |
| 7,363,363 B2 | 4/2008 | Dal Canto et al. | |
| 7,502,726 B2 * | 3/2009 | Panasyuk et al. | 703/22 |
| 7,633,483 B2 * | 12/2009 | Ben-Schachar et al. | 345/100 |
| 2001/0047406 A1 * | 11/2001 | Araujo et al. | 709/223 |
| 2002/0026590 A1 | 2/2002 | Kusunoki | |
| 2002/0059073 A1 | 5/2002 | Zondervan et al. | |
| 2002/0072974 A1 | 6/2002 | Pugliese, III et al. | |
| 2002/0124082 A1 | 9/2002 | San Andres et al. | |
| 2002/0129054 A1 | 9/2002 | Ferguson et al. | |
| 2002/0174359 A1 | 11/2002 | Haltmeyer | |
| 2002/0198965 A1 | 12/2002 | Kraft | |
| 2003/0055968 A1 | 3/2003 | Hochmuth et al. | |
| 2003/0126236 A1 | 7/2003 | Marl et al. | |
| 2003/0182392 A1 | 9/2003 | Kramer | |
| 2003/0195950 A1 | 10/2003 | Huang et al. | |
| 2003/0217166 A1 | 11/2003 | Dal Canto et al. | |
| 2004/0010786 A1 | 1/2004 | Cool et al. | |
| 2004/0039827 A1 * | 2/2004 | Thomas et al. | 709/228 |
| 2004/0045004 A1 | 3/2004 | Cheenath | |
| 2004/0073621 A1 | 4/2004 | Sampson | |
| 2004/0107125 A1 | 6/2004 | Guheen et al. | |
| 2004/0111519 A1 | 6/2004 | Fu et al. | |
| 2004/0167984 A1 | 8/2004 | Herrmann | |
| 2004/0205473 A1 | 10/2004 | Fisher et al. | |
| 2004/0250130 A1 | 12/2004 | Billharz et al. | |
| 2005/0010926 A1 | 1/2005 | Narayanaswamy et al. | |
| 2005/0027784 A1 | 2/2005 | Fusari | |
| 2005/0044225 A1 | 2/2005 | Ota et al. | |
| 2005/0080909 A1 | 4/2005 | Panasyuk et al. | |
| 2005/0080915 A1 | 4/2005 | Shoemaker et al. | |
| 2005/0097506 A1 | 5/2005 | Heumesser | |
| 2005/0125529 A1 | 6/2005 | Brockway et al. | |
| 2005/0125530 A1 | 6/2005 | Brockway et al. | |
| 2005/0125560 A1 | 6/2005 | Brockway et al. | |
| 2005/0125739 A1 | 6/2005 | Thompson et al. | |
| 2005/0198303 A1 | 9/2005 | Knauerhase et al. | |
| 2005/0198310 A1 | 9/2005 | Kim et al. | |
| 2005/0251855 A1 * | 11/2005 | Brandstatter | 726/12 |
| 2005/0267972 A1 | 12/2005 | Costa-Requena et al. | |
| 2005/0267974 A1 * | 12/2005 | Panasyuk et al. | 709/228 |
| 2006/0010125 A1 | 1/2006 | Beartusk et al. | |
| 2006/0015740 A1 | 1/2006 | Kramer | |
| 2006/0026235 A1 | 2/2006 | Schwarz et al. | |
| 2006/0026284 A1 | 2/2006 | Nguyen | |
| 2006/0029063 A1 * | 2/2006 | Rao et al. | 370/389 |
| 2006/0052998 A1 | 3/2006 | Michelman | |
| 2006/0069797 A1 | 3/2006 | Abdo et al. | |
| 2006/0070131 A1 | 3/2006 | Braddy et al. | |
| 2006/0112181 A1 | 5/2006 | Affaki | |
| 2006/0142878 A1 | 6/2006 | Banik et al. | |
| 2006/0143067 A1 | 6/2006 | Calabria | |
| 2006/0143703 A1 | 6/2006 | Hopen et al. | |
| 2006/0195895 A1 | 8/2006 | Ben-Shachar et al. | |
| 2006/0230105 A1 | 10/2006 | Shappir et al. | |
| 2006/0230156 A1 | 10/2006 | Shappir et al. | |
| 2006/0230438 A1 | 10/2006 | Shappir et al. | |
| 2006/0236325 A1 | 10/2006 | Rao et al. | |
| 2006/0248180 A1 | 11/2006 | Bernardi et al. | |
| 2006/0282855 A1 | 12/2006 | Margulis | |
| 2007/0005595 A1 | 1/2007 | Gafter | |
| 2007/0055650 A1 | 3/2007 | Duncan et al. | |
| 2007/0124373 A1 | 5/2007 | Chatterjee et al. | |
| 2007/0150551 A1 | 6/2007 | Krishnan et al. | |
| 2007/0156687 A1 | 7/2007 | Idicula et al. | |
| 2007/0162749 A1 | 7/2007 | Lim | |
| 2007/0168525 A1 | 7/2007 | DeLeon, III et al. | |
| 2007/0180448 A1 | 8/2007 | Low et al. | |
| 2007/0192329 A1 | 8/2007 | Croft et al. | |
| 2007/0198656 A1 | 8/2007 | Mazzaferri et al. | |
| 2007/0203972 A1 | 8/2007 | Wewalaarachchi et al. | |
| 2007/0233804 A1 | 10/2007 | Palekar et al. | |
| 2007/0244966 A1 | 10/2007 | Stoyanov et al. | |
| 2007/0245240 A1 | 10/2007 | Hudson, Jr. | |
| 2007/0260738 A1 | 11/2007 | Palekar et al. | |
| 2007/0282951 A1 | 12/2007 | Selimis et al. | |
| 2008/0015927 A1 | 1/2008 | Ramirez | |
| 2008/0034071 A1 | 2/2008 | Wilkinson et al. | |
| 2008/0034408 A1 | 2/2008 | Duggal | |
| 2008/0127348 A1 | 5/2008 | Largman et al. | |
| 2008/0134314 A1 | 6/2008 | Hamid | |
| 2008/0163171 A1 | 7/2008 | Chess et al. | |
| 2008/0209538 A1 | 8/2008 | Malakapalli et al. | |
| 2008/0222299 A1 | 9/2008 | Boodaei | |
| 2008/0228865 A1 | 9/2008 | Cruzada | |
| 2008/0235624 A1 | 9/2008 | Murata | |
| 2008/0250407 A1 | 10/2008 | Dadhia et al. | |
| 2010/0023582 A1 | 1/2010 | Pedersen et al. | |

OTHER PUBLICATIONS

"ProLiant Essentials Integrated Lights-Out Advanced Pack", available at least as early as Jun. 27, 2007, at <<http://h18000.www1.hp.com/products/quickspecs/11052_div/11052_div.HTML>>, Hewlett-Packard, 2004, pp. 1-3.

"iShadow Desktop—The Universal Citrix ICA, Terminal Services RDP, and VNC Client", available at least as early as Jun. 27, 2007, at <<http://www.dabcc.com/showcontent.aspx?id=2420>>, pp. 1-4.

Lubonski et al., "An Adaptation Architecture to Improve User-Perceived QoS of Multimedia Services for Enterprise Remote Desktop Protocols", Next Generation Internet Networks, 2005, Apr. 18-20, 2005, pp. 149-156.

"VMware Virtual Infrastructure", available at least as early as Jun. 27, 2007, at <<http://www.centriserv.com/products_vmware.php>>, CentriServ, 2006, pp. 1.

Mascolo et al., "XMILE: an XML based Approach for Incremental Code Mobility and Update," Automated Software Engineering, vol. 9, No. 2, Apr. 2002, found at <<http://www.cs.ucl.ac.uk/staff/c.mascolo/www/asemob.pdf>>, pp. 1-15.

Baude et al., "Interactive and Descriptor-based Deployment of Object-Oriented Grid Applications," Proceedings 11th IEEE Intl Symposium on High Performance Distributed Computing, 2002, found at at<<http://citeseer.ist.psu.edu/cache/papers/cs/26702/http:zSzzSzwww-sop.inria.frzSzoasiszSzJulien.VayssierezSzpublicationszSzhpdc2002_vayssiere.pdf/baude02interactive.pdf>>, 10 pgs.

Bhatia et al., "Extending Grid Protocols onto the Desktop using the Mozilla Framework," Proceedings of GCE'06, 2006, found at <<http://www.cogkit.org/GCE06/papers/CameraReady_126.pdf>>, pp. 1-4.

Miles, "Implementing Windows Terminal Server and Citrix MetaFrame on IBM @ server xSeries Servers", found at <<http://www.redbooks.ibm.com/redpapers/pdfs/redp3629.pdf>>, International Business Machines Corporation, Apr. 2003, 60 pgs.

"Using Terminal Services in Application Server Mode with Small Business Server 2000," retrieved on Oct. 10, 2007 at <<http://www.microsoft.com/technet/prodtechnol/sbs/2000/maintain/termsvcs.mspx>>, 2002, 13 pgs.

"Technical Overview of Management Services," Microsoft Windows Server 2003, retrieved from <<http://download.microsoft.com/download/1/c/7/1c701994-9f8a-47c2-ad65-7265356c10eb/Manageover.doc>>, Jul. 2002, 47 pgs.

Gelu, "Securing Access to External Networks with Authentication, Authorization and Accountability", found at <<http://www.loloweb.dyns.cx/files/gsec_gelu_laurent.pdf>>, GIAC Security Essentials Certification (GSEC), Apr. 7, 2004, pp. 1-19.

Helander, et al., "eLearning for Engineering," 9th International Conference on Engineering Education, Session M5H, Jul. 23-28, 2006, 6 pgs.

"Terminal Services Gateway (TS Gateway)", retrieved on Oct. 3, 2007 at <<http://technet2.microsoft.com/windowsserver2008/en/library/9da3742f-699d-4476-b050-c50aa14aaf081033.mspx?mfr=true>>, Microsoft Corporation, Sep. 24, 2007, 8 pgs.

"Remote Users Group Policies," retrieved on Oct. 3, 2007 at <<http://www.cleo.net.uk/index.php?category_id=332>>, CLEO, 2005, 6 pgs.

Smith, "S.H.A.U.N: Secure Hospital Access from the University Network," available at <<http://www.ja.net/community/nhs/shaun.pdf>>, Addenbrooke's NHS Trust, Jan. 2004, pp. 1-11.

MacDonald, "Secure Access of Network Resources by Remote Clients," accessible at <<http://www.sans.org/reading_room/whitepapers/vpns/759.php>>, GSEC version 1.3, SANS Institute, 2002, Feb. 20, 2006, pp. 1-22.

General, "Secure Foundations for Microsoft Terminal Services," accessible at <<http://www.giac.org/certified_professionals/practicals/gsec/3578.phpu>>, GSEC Practical V1.4b, Jan. 11, 2004, pp. 1-21.

Tsai, et al., "Towards Ubiquitous Computing via Secure Desktop Service," accessible at <<http://ieeexplore.ieee.org/iel5/7544/20542/00949577.pdf?isNumber=>>, IEEE Catalog No. 01CH37239, 2001, pp. 187-190.

International Search Report for International Application No. PCT/US2008/053506, mailed on Jun. 24, 2008 (10 pages).

"TS Session Broker", Microsoft TechNet, Jan. 21, 2008, retrieved from the internet at <<http://technet.microsoft.com/en-us/library/cc732594(WS.10).aspx>>.

"TS Session Broker", Microsoft TechNet, Jan. 21, 2008, retrieved from the internet at <<http://technet.microsoft.com/en-us/library/cc732594(WS.10.printer).aspx>> on Sep. 16, 2009, 3 pages.

"Access to Work—Dev Design Specification", Microsoft Confidential, Version 1, pp. 1-25.

Jose, "Workspace Versioning and Configuration Management API", retrieved on Apr. 15, 2008 at <<http://www.reswhitepapers.com/documents/VirtualizedUserWorkspaceManagementBeyondDesktopManagement.pdf>>, Java Boutique, pp. 1-3.

Koetzing, "Centralizing Application Access with Visionapp Workspace Management 2008", retrieved on Apr. 15, 2008 at <<http://www.thomaskoetzing.de/index.php?option=com_content&task=view&id=266&Itemid=289>>, Thomas Koetzing, 2001, pp. 1-5.

"M2 Access to Work—Dev Design Specification", Microsoft Confidential, Version 1.0, pp. 1-21.

"Virtualized User Workspace Management for Windows Environments", RES Software, 2007, pp. 1-6.

"Workspace Integration Into Win7 Networking UI—Feature Summary", Windows Server—Terminal Services Team, pp. 1-8.

"Workspace Runtime—Dev Design Specification", Microsoft Confidential, Version 1, pp. 1-15.

Office Action for U.S. Appl. No. 11/771,921, mailed on Apr. 29, 2011, Ashwin Palekar, "Virtual Desktop Integration with Terminal Services," 21 pages.

The International Search Report and Written Opinion for PCT/US2008/053506, mailed Jun. 24, 2008, 10 pages.

Non-Final Office Action for U.S. Appl. No. 12/163,673, mailed on Aug. 17, 2011, Ayesha M. Mascarenhas, "Integrated Client for Access to Remote Resources", 12 pages.

Office Action for U.S. Appl. No. 11/771,921, mailed on Dec. 8, 2011, Ashwin Palekar, "Virtual Desktop Integration with Terminal Services", 20 pgs.

Final Office Action for U.S. Appl. No. 12/103,542, mailed on Sep. 1, 2011, Ido Ben-Shachar, "Securely Pushing Connection Settings to a Terminal Server Using Tickets", 27 pages.

* cited by examiner

STRATEGIES FOR SECURELY APPLYING CONNECTION POLICIES VIA A GATEWAY

BACKGROUND

A terminal service (TS) system allows a TS client to interact with an application being run on a remote TS server. A user who interacts with the application receives generally the same user experience that would be provided if the application were implemented locally by the TS client. Implementing the application on the TS server device affords a number of benefits. For instance, it may be easier to administer an application that is maintained at a central location.

In a first case, an organization (such as a corporation) may include a TS server that is accessible to a group of clients within the organization. In this scenario, the TS clients can access the TS server without special security provisions because the TS clients are presumed to be trusted entities. In a second case, the organization may wish to make its TS server available to another group of clients that are located outside the organization. For example, the organization may wish to allow employees to access its terminal server from their home via the Internet. In this scenario, the TS clients cannot access the TS server without special security provisions. According to one solution, the organization may use a gateway that sits behind a firewall to administer the interaction between external TS clients and the TS server.

However, there are potential vulnerabilities in above-described type of architecture. Consider the case of device redirection. In a TS system, device redirection allows a user who is interacting with a TS server to utilize devices that are associated with the TS server and devices that are associated with the TS client. For example, a user who is interacting with a word processing program that is being run on the TS server can specify that information is to be saved and retrieved from a storage device that is local with respect to the user's client device. This may allow a malicious user (or other entity) to potentially corrupt the data processing infrastructure of the organization by uploading viruses and the like to the TS server.

There is accordingly an exemplary need to improve the security of TS systems (and the like) that employ a gateway.

SUMMARY

A strategy is described for securely applying connection policies in a system that includes a first entity connected to a second entity via a gateway using a remote-operating protocol. The first entity can comprise a terminal service (TS) client, the second entity can comprise a TS server, and the remote-operating protocol can comprise Remote Desktop Protocol (RDP). The strategy involves establishing a first secure channel between the gateway and the TS server and transmitting policy information from the gateway to the TS server. The strategy then involves deactivating the first secure channel and setting up a second secure channel between the TS client and the TS server. The strategy uses the second secure channel to transmit RDP data from the TS client to the TS server. The TS server uses the previously-transmitted policy information to determine whether to enable or disable a feature that affects the TS client, such as device redirection.

The strategy confers a number of benefits. According to one exemplary benefit, the strategy allows a trusted TS server to enforce policy information that affects the TS client, rather than relying on the TS client (which may be malicious). According to another benefit, the strategy provides a centric management of policy; versus group policy, this facilitates each user policy management. According to another benefit, the additional secure channel is deployed between the gateway and the TS server; since these entities are "close," there is little extra delay for building up a connection.

Additional exemplary implementations and attendant benefits are described in the following.

Figure 1:
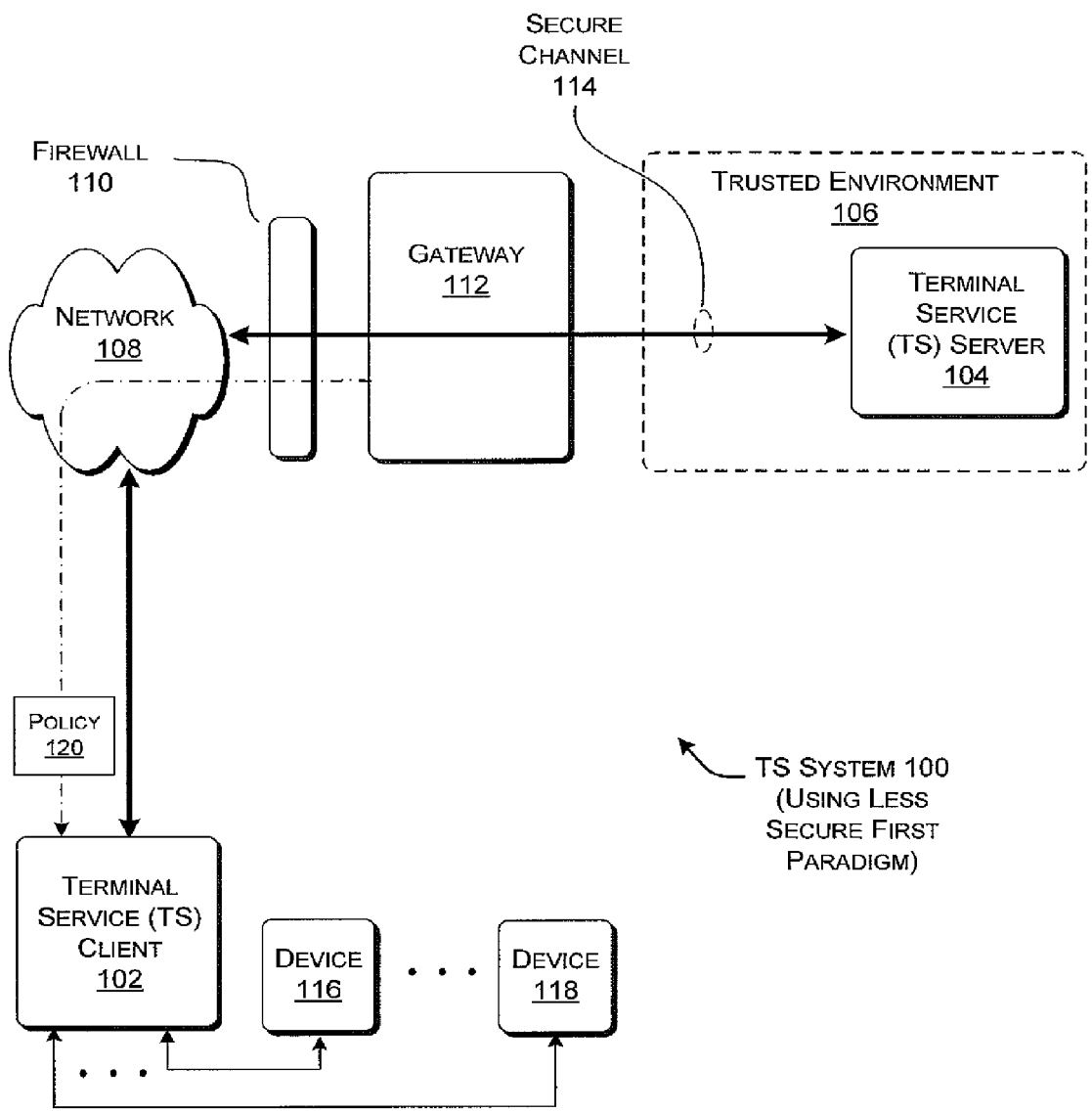
FIG. 1 shows an exemplary terminal service (TS) system that uses a first paradigm to transmit data from a TS client to a TS server; the first paradigm may expose the TS system to malicious activity by the TS client.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for securely applying connection policies in a system that includes a first entity connected to a second entity via a gateway using a remote-operating protocol. The strategy can be manifested in various systems, apparatuses, modules, procedures, storage mediums, data structures, and other forms.

This disclosure includes the following sections. Section A describes an exemplary system for transmitting data using a first paradigm. The first paradigm may expose the system to certain security threats. Section B describes an exemplary system for transmitting data using a second paradigm. The second paradigm provides enhanced security compared to the first paradigm. Section C describes exemplary processing functionality that can be used to implement any aspect of the systems described in Sections A and B.

As a preliminary note, any of the functions described with reference to the figures can be implemented using software, firmware, hardware (e.g., fixed logic circuitry), manual processing, or a combination of these implementations. The term "logic,", "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Certain aspects of the technology set forth herein are explained in flow chart form. In these flow charts, certain operations are described as constituting distinct blocks performed in a certain order. Such implementations are exemplary and non-limiting. Certain blocks can be grouped together and performed in a single operation, and certain blocks can be performed in an order that differs from the illustrated order. The blocks shown in the flowcharts can be implemented by software, firmware, hardware, manual processing, any combination of these implementations.

Certain aspects of the technology set forth herein are explained in the context of a terminal service (TS) system that uses a remote operating protocol. For example, without limitation, the technology can be implemented using the Remote Desktop Protocol (RDP). A TS system using RDP allows a TS client to interact with one or more applications maintained on a remote TS server. The user receives the same user experience that would be provided if the applications were being locally run on the TS client. While the following explanation uses the terms "TS client" (instead of "first entity"), "TS server" (instead of "second entity"), and "RDP" (instead of "remote operating protocol"), it should be noted that the principles described herein can be applied to other implementations.

A. System and Method Using First Paradigm

FIG. 1 shows a TS system 100 for transmitting RDP data between a TS client 102 and a TS server 104 using a first paradigm. As noted above, the first paradigm may expose the system 100 to certain malicious activity that the TS client 102 may perform. Thus, Section A mainly acts as a vehicle for more effectively communicating the solutions described in the next section.

The TS server 104 is provided within a trusted environment 106. The trusted environment 106 may correspond to a data processing infrastructure provided by any type of organization, such as a corporation, educational institution, governmental institution, and so on. Although not shown, the trusted environment 106 may generally include a collection of server computers, networks (such as intranets), "internal" clients, routers, data storage devices, and so on. The trusted environment 106 is trusted in the sense that there is an expectation that entities that interact with the TS server 104 from within the trusted environment 106 can be generally relied on to not deliberately cause damage to the trusted environment 106.

The TS client 102 is external to the trusted environment 106. For example, the TS client 102 may represent any type of client device that interacts with the TS server 104 via a network 108. For example, the client device 102 can comprise a personal computer, a laptop computer, a personal digital assistant (PDA), a stylus-type input device, a mobile telephone, a game console, a set-top box associated with a television set, and so on. The network 108 can comprise any type of communication mechanism that is not under the control of the trusted environment 106. For example, the network 108 can comprise the Internet.

The TS system 100 uses a firewall 110 and a gateway 112 to allow the external TS client 102 to access the TS server 104. The firewall 110 can comprise a conventional mechanism for restricting the type of data being transmitted to the trusted environment 106 based on predefined rules. The gateway 112 acts as a proxy for forwarding RDP data between the TS client 102 and the TS server 104. The gateway 112 applies various policies which govern what actions are allowed and disallowed when interacting with external TS clients.

The system 102 can use a single secure channel 114 to transmit RDP data between the TS client 102 and the TS server 104. The RDP data that is sent over this channel 114 is encrypted, so it cannot be acted upon by any entity midstream between the TS client 102 and the TS server 104.

TS technology includes a feature referred to in the art as device redirection. First, consider the use of device redirection for clients within the trusted environment 106. When a user is interacting with an application being run on the TS server 104, device redirection allows the user to access devices associated with the TS server 104 as well as devices associated with the internal TS client. More specifically, the TS server 104 may have various devices associated therewith, such as various storage devices (associated with various drives), various printing devices, various scanning devices, various audio input and output devices, and so forth. Likewise, the internal TS client may have various devices associated therewith, including the same kinds of devices mentioned above. Device redirection allows a user to interact with any of these devices in the course of a TS session. For example, consider the case in which the user is using an internal TS client to interact with a word processing program being run on the TS server 104. The user can store and retrieve documents to/from storage locations that are considered local to the TS server 104. But the user can also store and retrieve documents to/from storage locations that are considered local to the internal client.

Device redirection that occurs within the confines of the trusted environment 106 may not pose a significant risk. This is because, as stated above, the users and components within the trusted environment 106 are trusted to not deliberately cause damage to the trusted environment 106. However, device redirection in the context of the external TS client 102 may pose a risk. This is because the TS client 102 is situated outside the trusted environment 106, and therefore may be untrustworthy.

Consider the specific scenario in which the TS client 102 includes local devices (116, . . . 118). A malicious user who is operating the TS client 102 can potentially introduce destructive code into the trusted environment 106 through the use of device redirection. For instance, consider the above example in which the user is interacting with a word processing program on the TS server 104 and wishes to retrieve a document from a drive that is local to a TS client. If this document contains destructive code or other harmful content, it can potentially cause damage to the TS server 104 or other parts of the trusted environment 106.

In certain circumstances, it may therefore be desirable to disable device redirection for the external TS client 102. FIG. 1 shows a first paradigm for accomplishing this result. However, the first paradigm has potential shortcomings. As will be explained below, there is a risk that a malicious external TS client can circumvent the provisions of the first paradigm and still cause damage to the trusted environment 106.

According to the first paradigm, the gateway 112 transmits policy information 120 to the TS client 102. The policy information 120 conveys the status of one or more features of a TS session between the TS client 102 and the TS server 104. For example, the policy information 120 can indicate whether these features are enabled or disabled. In the specific context of device redirection, the policy information 120 can be used to indicate that device redirection is disabled for external TS client 102. The policy information 120 can be expressed in various formats, such as a collection of one or more flags.

The first paradigm is based on the expectation that the TS client 102 will forward the policy information 120 (or information derived therefrom) to the TS server 104 at the start of sending RDP data to TS server 104. (The RDP data reflects the normal flow of data that enables the TS client 102 to interact with the TS server 104.) The first paradigm is based on the further expectation that the TS server 104, upon receiving the policy information 120, will take appropriate action based on the status information contained therein. For example, if the policy information 120 informs the TS server 104 that it should disable device redirection, the TS server 104 will prevent the external TS client 102 from using device redirection.

Because the TS client 102 is external to the trusted environment 106, it cannot necessarily be trusted. As such, the TS client 102 may fail to carry out its proper role in forwarding the policy information 120 to the TS server 104. Alternatively, the TS client 102 can send tampered policy information 120 to the TS server 104. For example, the TS client 102 can change the policy information 102 to indicate that device redirection is enabled (when it should, in fact, be disabled). This will cause the TS server 104 to enable device redirection, which, in turn, provides an avenue through which the TS client 102 can upload destructive code to the TS server 104.

Figure 2:
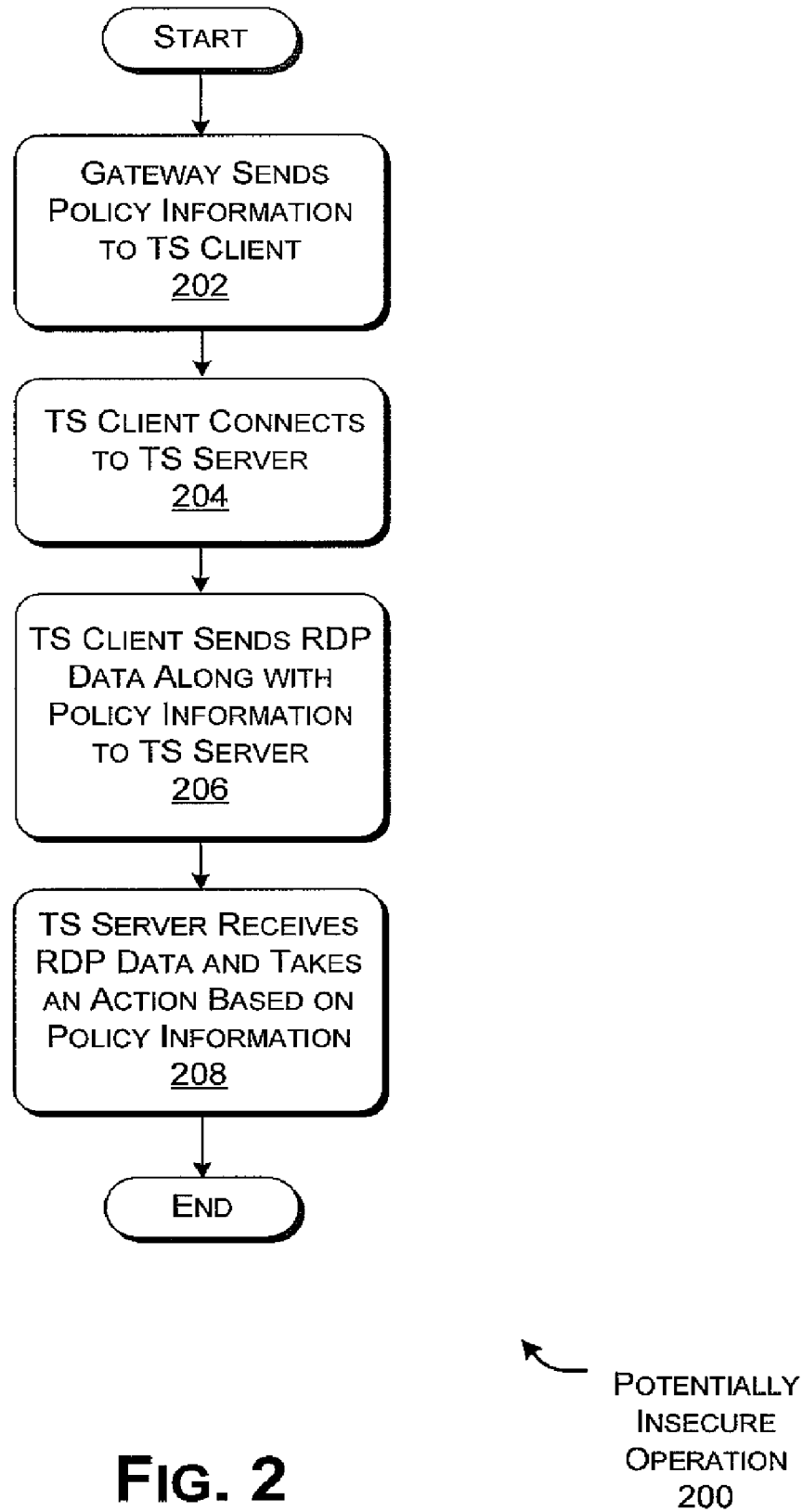
FIG. 2 is a flowchart that illustrates an exemplary manner of operation of the TS system of FIG. 1.

FIG. 2 is a procedure 200 which summarizes the above-described operation of the TS system 100.

In block 202, the gateway 112 sends the policy information 120 to the external TS client 102.

In block 204, the TS client 102 connects to the TS server 104 via the gateway 112 to conduct a TS session, e.g., involving the exchange of RDP data.

In block 206, the TS client 102 is expected to transmit the policy information to the TS server 104 when it starts sending RDP data. As described above, a malicious TS client 102 can subvert this operation in various ways.

In block 208, the TS server 104 receives the policy information 120 and the RDP data. The TS server 104 conducts a TS session based the policy information 120. As described above, the policy information 120 may have the effect of enabling or disabling one or more features of a TS session, such as such as device redirection.

Note that, while the gateway 112 performs a role in policing the interaction between external TS clients and the TS server 104, the gateway 112 cannot gain direct access to the RDP data. This is because the RDP data is encrypted en route between the TS client 102 and the TS server 104. This presents various constraints on the use of the gateway 112 to directly disable device redirection.

B. System and Method Using Second Paradigm

Figure 3:
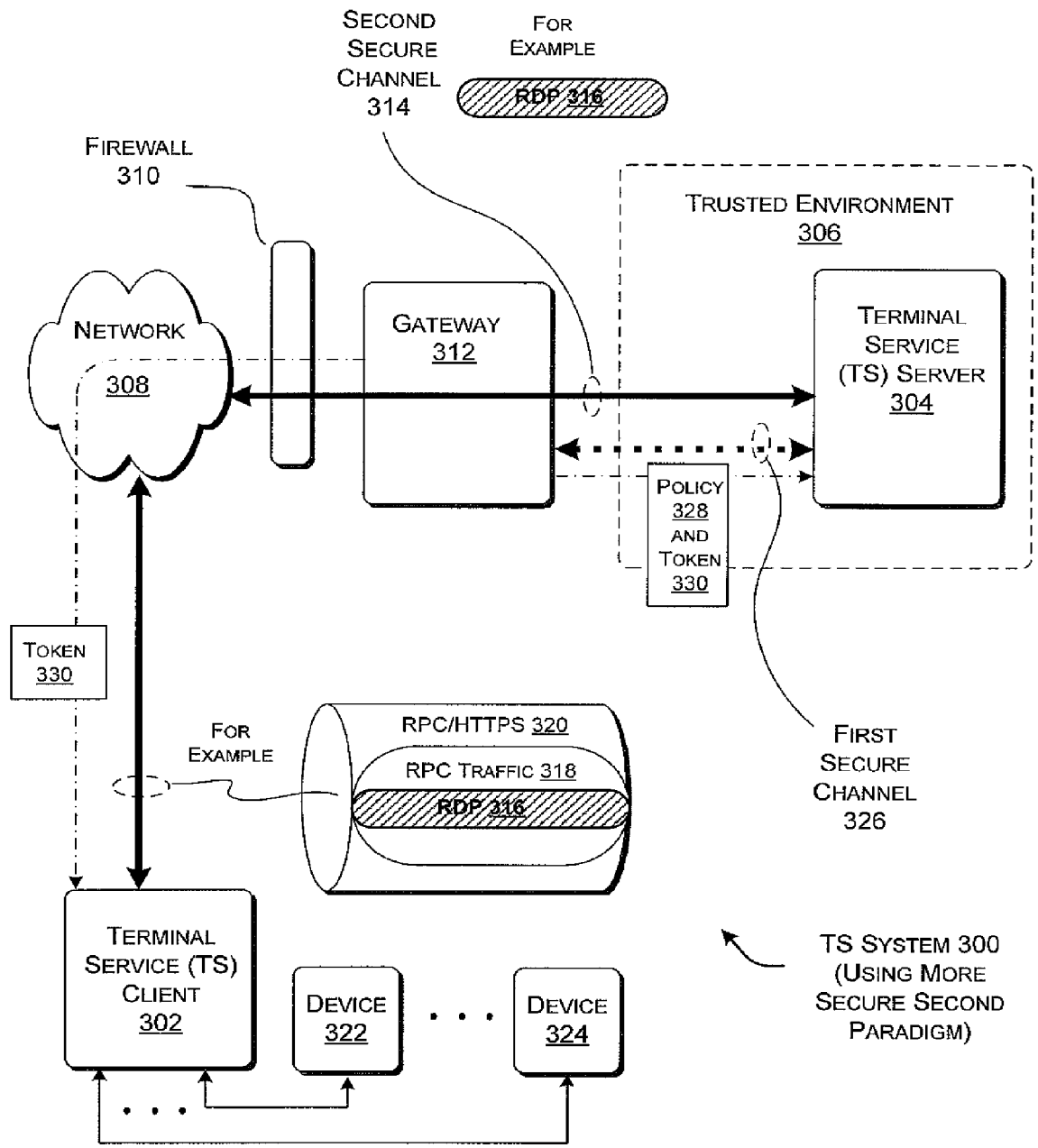
FIG. 3 shows an exemplary TS system that uses a second paradigm to transmit data from a TS client to a TS server; the second paradigm provides safeguards against malicious activity by the TS client.

A TS system 300 of FIG. 3 uses a second paradigm to transfer RDP data from a client 302 to a TS server 304. For frame of reference, the first TS system 100 of FIG. 1 was client-centric in the sense that it relied on the TS client 102 to disable device redirection. The solution provided in FIG. 3 is server-centric in the sense that it relies on the TS server 304 alone to disable device redirection. Since the TS server 304 is situated within a trusted environment 306, the second paradigm can more reliably disable device redirection compared to the first paradigm.

At the outset, it should be noted that the TS system 300 of FIG. 3 is described in the specific context of the disablement of device redirection. However, the TS paradigm can be applied to affect the status of any aspect of a TS session In one general case, for instance, the second paradigm can allow the TS server 304 to disable any identified type of packet within the RDP data.

The TS system 300 of FIG. 3 includes a similar contextual setting to the TS system 100 of FIG. 100. Namely, the TS client 302 interacts with the TS server 304 in the trusted environment 306. The TS client 302 can access the TS server 304 via a network 308 (such as the Internet), firewall 310, and gateway 312. Without limitation, according to one exemplary implementation, certain aspects of the gateway 312 of FIG. 3 can be implemented using technology described in U.S. Applications: (1) U.S Ser. No. 60/716,297, filed on Sep. 12, 2005, entitled "Building Application-Aware Firewall Traversal Solutions"; and (2) U.S. Ser. No. 11/067,125, filed on Feb. 5, 2005, entitled "Enabling Terminal Services through a Firewall." Both of these applications are incorporated by reference herein in their respective entireties.

The TS client 302 can exchange RDP data with the TS server 304 via a second secure channel 314. (This channel is called a "second" channel to distinguish it from a first channel which is established temporally prior to the second channel 314, to be explained in greater detail below). According to one exemplary implementation, to transmit RDP data 316 to the TS server 304, the TS system 300 can first wrap the RDP data 316 in an RPC-based protocol 318 (where RDC denotes Remote Procedure Call). This information, in turn, can then be layered over an HTTPS protocol 320 (where HTTPS denotes Hypertext Transfer Protocol Security). Prior to reaching the TS server 304, the TS system 300 can strip off the various layers to yield the RPC data 316 itself. Generally, the RDP data 316 transmitted via the second channel 314 is secure. For example, the RDP data can be protected using SSL (where SSL denotes Secure Socket Layers).

The TS client 302 can interact with one or more local devices, such as devices (322, . . . 324). These devices (322, . . . 324) can include local storage devices, printers, audio input and output devices, and so forth.

Now the features of the second paradigm will be set forth in greater detail. First note that the TS system 300 establishes a first secure channel 326 between the gateway 312 and the TS server 304. This channel 326 is used to transfer policy information 328 to the TS server 304 prior to the exchange of RDP data using the second channel 314. The policy information 328 conveys information regarding one or more features that affect the exchange of RDP data between the TS client 302 and the TS server 304. In one non-limiting case, the policy information 328 includes an instruction to disable device redirection for the TS client 302.

Like the second channel 314, the first channel 326 is secure. For instance, the TS system 300 can encrypt the information being transmitted via the first channel 326. In one implementation, the TS system 300 uses SSL for the first channel 326.

The TS system 300 deactivates the first channel 326 before sending the RDP data using the second channel 314. Upon receipt of the RDP data via the second channel 314, the TS server 304 enables or disables certain features in accordance with the instructions conveyed by the policy information 328. Note that the exchange of policy information 328 to the TS server 304 does not rely on the good-faith actions of the TS client 302. Thus, the second paradigm is potentially more secure than the first paradigm used by the first TS system 100.

Each TS session is governed by associated policy information. Thus, the TS system 300 may apply first policy information to a first TS client and second policy information to a second TS client, and so on. Further, the policy information may optionally be specific to each connection, such that the same TS client may receive first policy information when it connects to the TS server 304 at time X and receive second policy information when it connects to the TS server 304 at time Y.

To address the above issue, the gateway 312 can send a token 330 to the TS client 302 when the TS client 302 requests a connection with the TS server 304. The role of the token 330 is to identify the TS client 302. When the gateway 312 forwards the policy information 328 to the TS server 304, it can also forward the token 330 assigned to this particular TS client 302 (and this particular connection). The TS server 304 can subsequently use the token 330 to apply the correct policy information 328 to the TS client 302.

Figure 4:
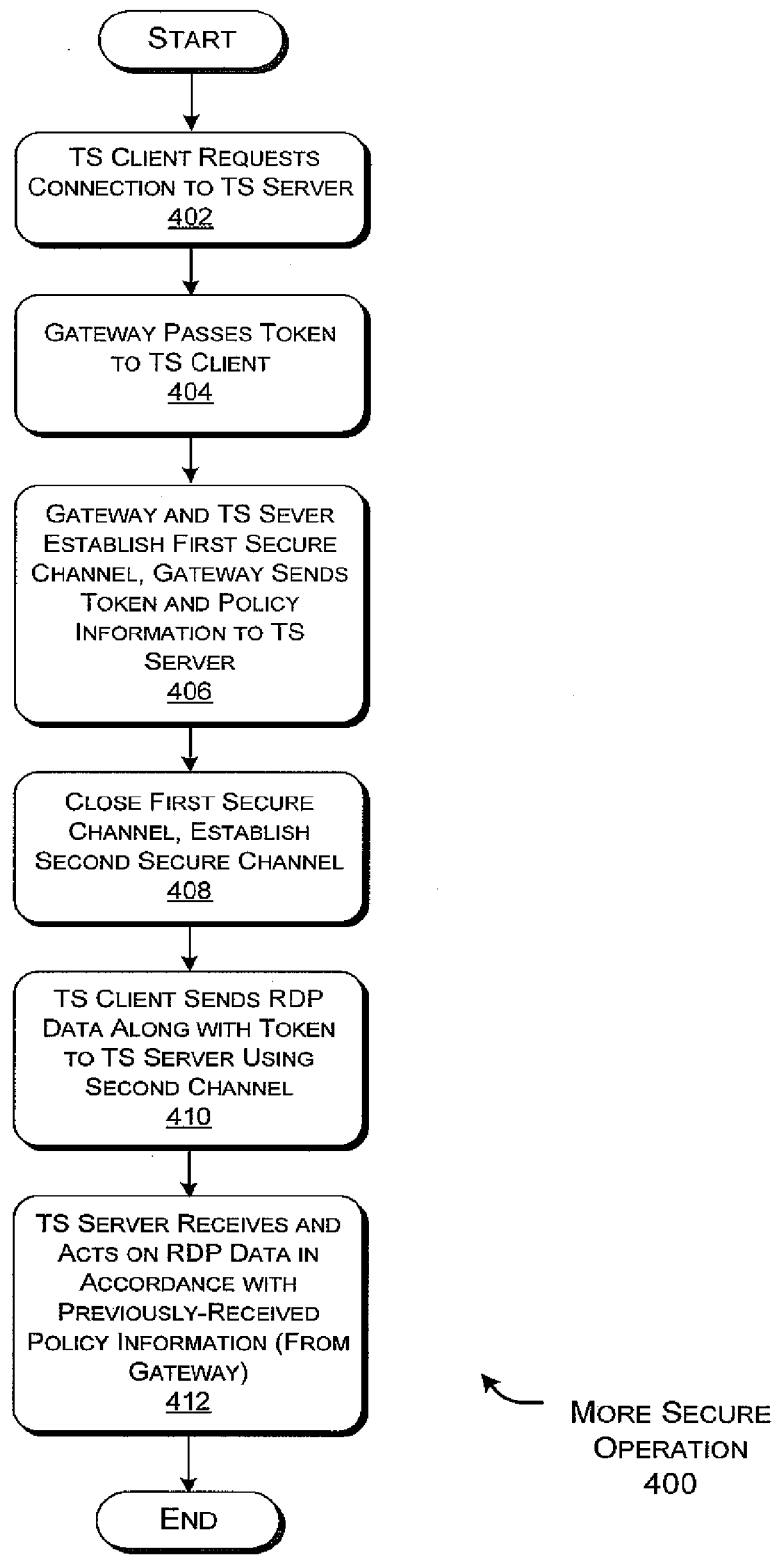
FIG. 4 is a flowchart that illustrates an exemplary manner of operation of the TS system of FIG. 3.

FIG. 4 shows a procedure 400 which summarizes the above-described operation of the TS system 300.

In block 402, the TS client 302 requests a connection to the TS server 304 to conduct an RDP session with the TS server 304.

In block 404, the gateway 312 passes the token 330 to the TS client 302. The token 330 is used to identify the TS client 302.

In block 406, the gateway 312 and the TS server 304 establish the first secure channel 326. Through this channel 326, the gateway 312 sends the policy information 328 and token information 330 to the TS server 304. The policy information 328 identifies features of an RDP session which are enabled or disabled with respect to the particular TS client 302 and the particular connection, as identified by the token 330.

In block 408, the TS system 300 closes the first channel 326 and establishes the second channel 314.

In block 410, the TS client 302 sends RDP data with the token 330 to the TS server 304 via the second channel 314. The TS server 304 can apply the correct policy information 328 to the TS client 302 according to the token 330.

In block 412, the TS server 304 can govern the ensuing exchange of RDP data based on the instructions contained in the policy information 328. In one particular case, this may involve disabling device redirection. This reduces the possibility that the TS client 302 can corrupt the trusted environment 306 through its local devices (322, . . . 324).

Figure 5:
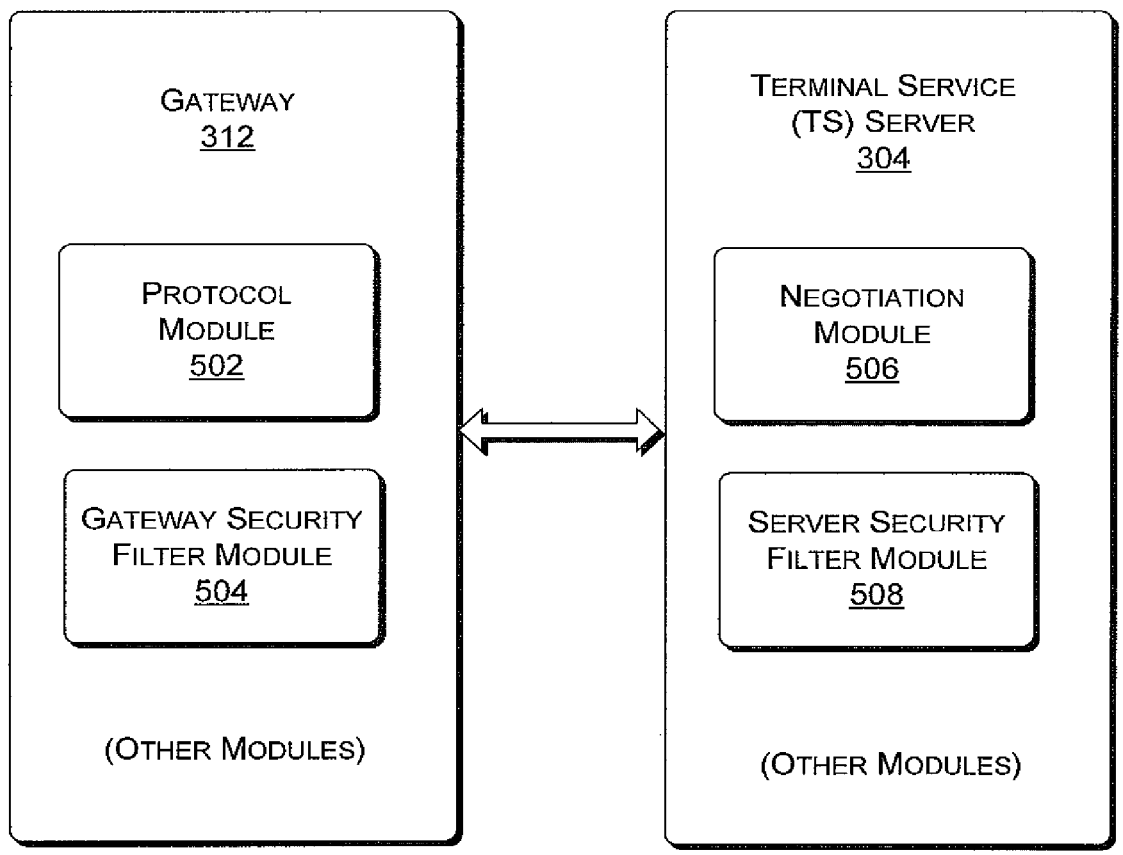
FIGS. 5 and 6 show one exemplary implementation of the TS system of FIG. 3.
Figure 6:
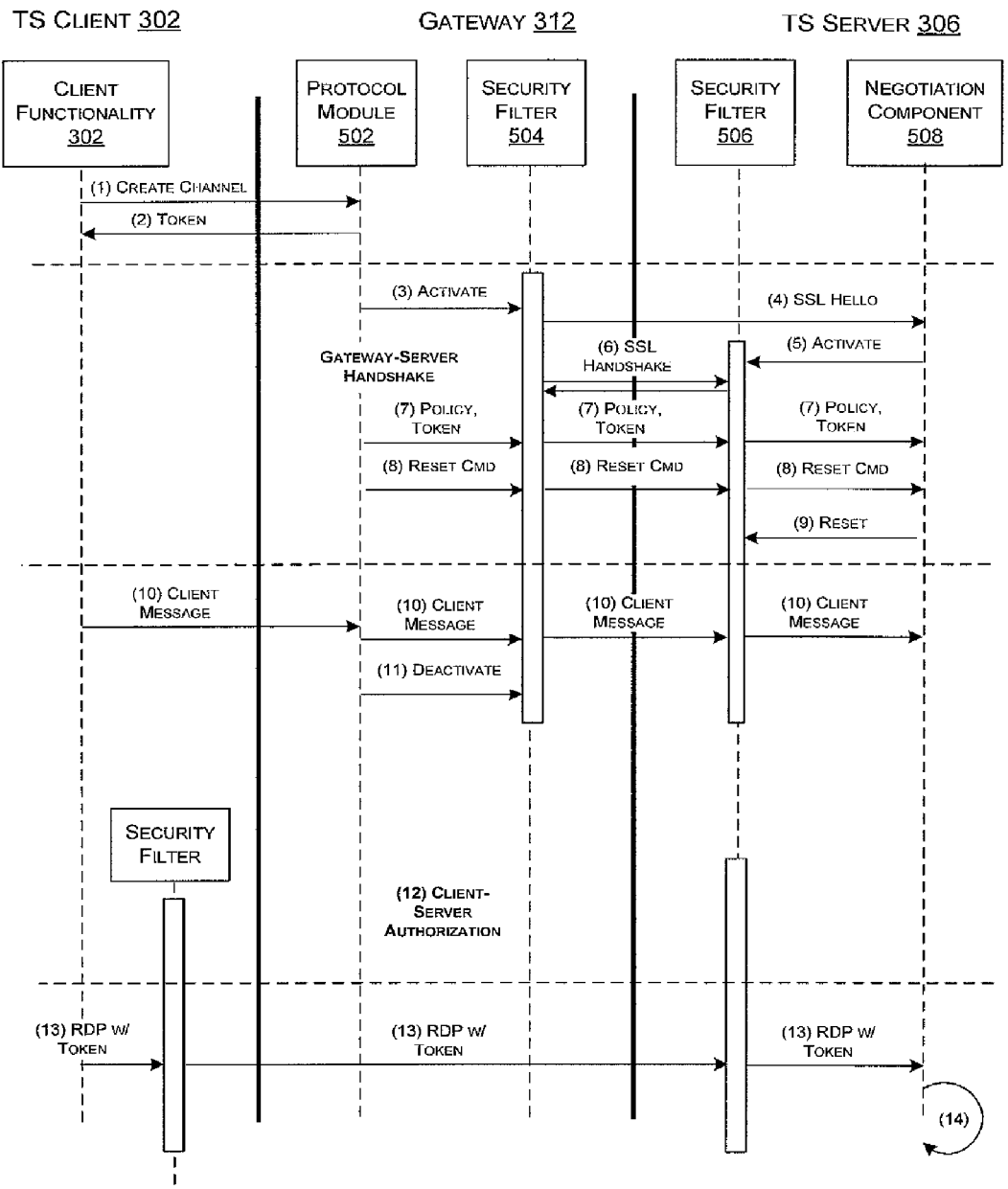

FIGS. 5 and 6 shows one exemplary implementation of the principles set forth in FIGS. 3 and 4.

FIG. 5 indicates that the gateway 312 can include a protocol module 502 and a gateway security filter module 504. These components are relevant to the secure transfer of RDP data described herein. The policy module 502 generates the policy information 328 and the token 330. The gateway security filter module 504 establishes secure exchange of information from the perspective of the gateway 312. That is, the gateway security filter module 504 generates a security context and performs encryption and decryption.

The TS server 306 can include a negotiation module 506 and a server security filter module 508. These components are relevant to the secure transfer of RDP data described herein. The negotiation module 506 acts on information sent to the TS server 306 in a manner set forth more fully below in the context of FIG. 6 below. The server security filter module 508 establishes secure exchange of information in the TS system 300 from the perspective of the TS server 304. (Although not shown, the TS client 302 includes a client security filter module for establishing the secure exchange of information from the perspective of the TS client 302.)

FIG. 6 shows how the components set forth in FIG. 5 interact with each other, according to one exemplary implementation. The operations in FIG. 6 are numbered based on an exemplary order in which these operations can be performed. The ordering of these operations can be modified in various ways.

In operation (1), the TS client 302 issues a channel creation request to the gateway 312.

In operation (2), the gateway 312 generates the token 330 and sends the token 330 to the TS client 302. The token 330 can be expressed as a unique GUID.

In operation (3), the gateway 312 activates the gateway security filter module 504.

In operation (4), the gateway security filter module 504 sends a SSL hello to the TS server 304.

In operation (5), the server negotiation module 506 recognizes the SSL hello message and activates the server security filter module 508.

In operation (6), an SSL handshake occurs between the gateway 312 and the TS server 306 to establish the first secure channel 326. Schannel can be used for this security channel 326.

In operation (7), the gateway 312 generates policy information 328. In this example, the policy information 328 takes the form a device redirection data unit. The gateway 312 sends the device redirection data unit to the TS server 304 along with the token 330.

In operation (8), the gateway 312 sends a reset command to the TS server 304.

In operation (9), the TS server 304 instructs the server security filter module 508 to be ready for restarting.

In operation (10), the TS client 302 sends messages to the TS server 304 via the gateway 312. More specifically, a first message sent by the TS client 302 is a protocol negotiation message or a SSL hello. This message will pass through the gateway security filter module 504 and the server security filter module 508. This message can possibly reach the gateway 312 before the gateway/server authentication. If so, the message remains waiting to be handled.

In operation (11), the gateway 312 deactivates the gateway security filter module 504 after sending out the above-described message (in operation 10).

In operation (12), the TS client 302 and the TS server 204 perform authorization to establish the second channel 314.

In operation (13), the TS client 302 sends a first RDP packet along with the stored token 330 to the TS server 304.

In operation (14), the TS server 304 enables or disables device redirection based on the policy information 328 and the token 330.

C. Exemplary Processing Functionality

Figure 7:
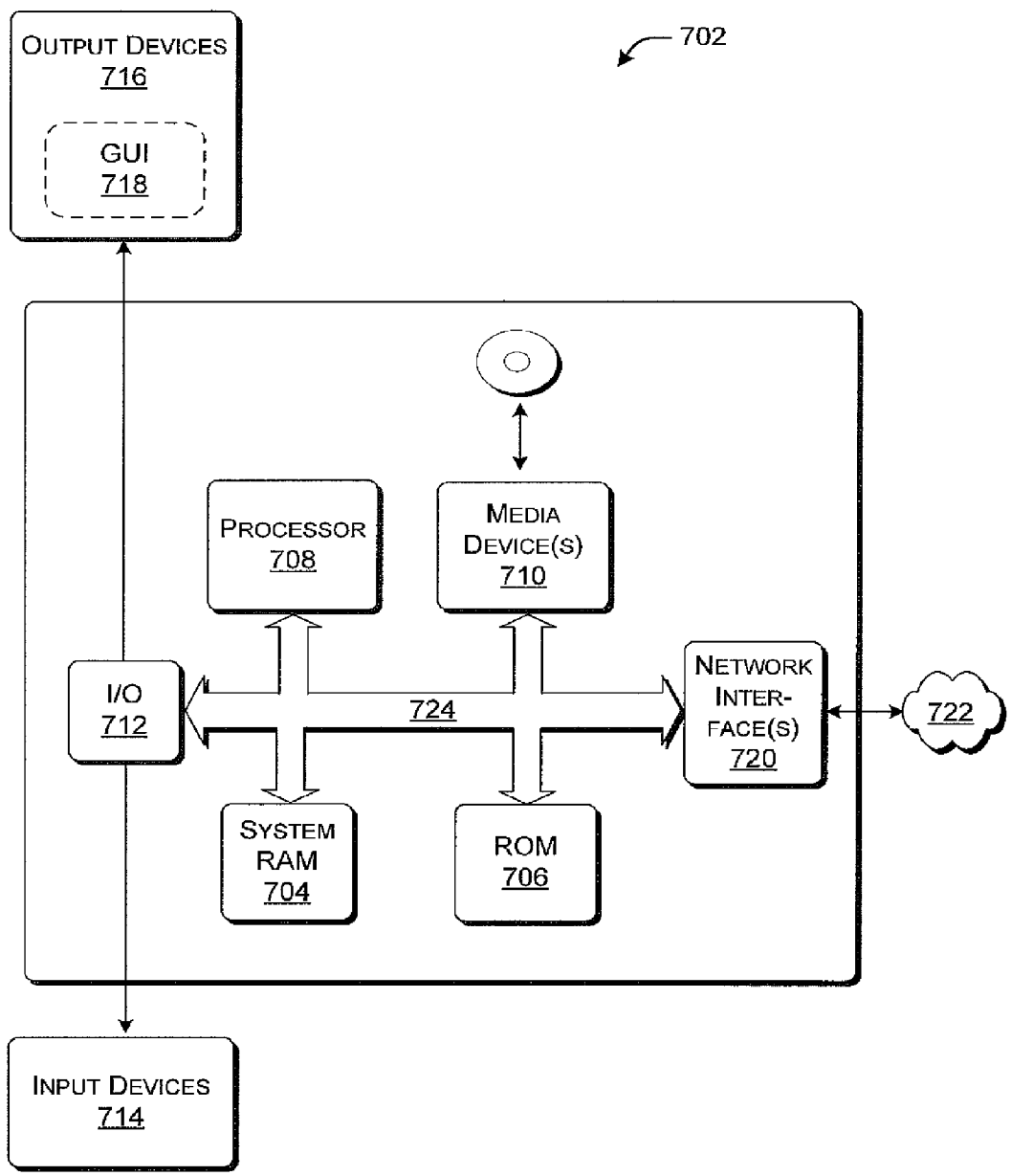
FIG. 7 shows exemplary processing functionality that can be used to implement any aspect of the systems of FIGS. 3 and 5.

FIG. 7 sets forth exemplary processing functionality 702 that can be used to implement any aspect of systems shown in FIGS. 3 and 5. In one non-limiting case, for instance, the processing functionality 702 may represent any TS client, any TS server, any computer used by the gateway, and so on.

The processing functionality 702 can include various volatile and non-volatile memory, such as RAM 704 and ROM 706, as well as one or more central processing units (CPUs) 708. The processing functionality 702 can perform various operations identified above when the CPU 708 executes instructions that are maintained by memory (e.g., 704, 706, or elsewhere). The processing functionality 702 also optionally includes various media devices 710, such as a hard disk module, an optical disk module, and so forth.

The processing functionality 702 also includes an input/output module 712 for receiving various inputs from the user (via input devices 714), and for providing various outputs to the user (via output devices 716). One particular output device may include a display apparatus and an associated graphical user interface (GUI) 718. The processing functionality 702 can also include one or more network interfaces 720 for exchanging data with other devices via one or more communication conduits 722. One or more communication buses 724 communicatively couple the above-described components together.

The communication conduits 722 can be implemented in different ways to suit different technical and commercial environments. For instance, the communication conduits 722 can include any kind of network (or combination of networks), such as a wide area network (e.g., the Internet), an intranet, Digital Subscriber Line (DSL) network infrastructure, point-to-point coupling infrastructure, and so on. In the case where one or more digital networks are used to exchange information, the communication conduits 722 can include various hardwired and/or wireless links, routers, gateways, name servers, and so on. The communication conduits 722 can be governed by any protocol or combination of protocols.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it: is to be understood that the invention defined in the appended claims is not necessarily limited to the specific features or acts described. Rather, the specific features and acts are disclosed as exemplary forms of implementing the claimed invention.

What is claimed is:

1. A method for securely receiving data from a terminal service (TS) client at a TS server via a gateway using a remote-operating protocol, comprising:
   establishing a first secure channel between the gateway and the TS server without involving the TS client;
   receiving policy information from the gateway at the TS server via the first secure channel, the policy information identifying a manner in which the TS server is to interact with the TS client, wherein the TS server receives the policy information from the gateway and does not receive the policy information from the TS client;
   receiving a token from the gateway at the TS server via the first secure channel;
   deactivating the first secure channel;
   subsequent to deactivating the first secure channel, establishing a second secure channel between the TS client and the TS server;
   receiving data at the TS server from the TS client via the second secure channel, wherein the data includes another token associated with the token, the another token being used by the TS server to identify the TS client and apply the policy information to the TS client; and
   taking action on the data at the TS server based on the policy information previously transmitted from the gateway to the TS server.

2. The method of claim 1, wherein the remote-operating protocol is Remote Desktop Protocol (RDP).

3. The method of claim 1, wherein the first secure channel is formed as a Secure Sockets Layer (SSL) channel.

4. The method of claim 1, wherein the second secure channel is formed as a Secure Sockets Layer (SSL) channel.

5. The method of claim 1, where the policy information indicates enabling or disabling a feature that affects the TS client.

6. The method of claim 5, wherein the feature is device redirection.

7. The method of claim 5, wherein the feature is associated with at least one packet of the remote-operating protocol.

8. One or more storage devices having stored thereon machine-readable instructions that, when executed on a processor, configure a gateway computing device to:
   establish a first secure channel between the gateway computing device and a terminal service (TS) server, wherein the first secure channel does not include a TS client;
   send policy information from the gateway computing device to the TS server via the first secure channel, the policy information identifying a manner in which the TS server is to interact with the TS client, wherein the gateway computing device sends the policy information to the TS server and the TS client does not send the policy information to the TS server;
   send a token from the gateway computing device to each of the TS server and the TS client, wherein the token sent to the TS server is used by the TS server to identify the TS client and apply the policy information to the TS client when the TS server receives the token sent to the TS client;
   deactivate the first secure channel; and
   subsequent to deactivating the first secure channel, establish a second secure channel between the TS server and the TS client, wherein the second secure channel is used to transmit data from the TS client to the TS server so that the data is processed at the TS server in accordance with the policy information previously sent from the gateway computing device to the TS server.

9. The one or more storage devices of claim 8, wherein the policy information indicates enabling or disabling a feature that affects the TS client.

10. The one or more storage devices of claim 9, wherein the feature is device redirection.

11. A gateway system for securely transmitting data between a terminal service (TS) server and a TS client using a remote-operating protocol, comprising:
    a processor; and
    a memory coupled to the processor storing:
    a policy module, operable by the processor, configured to generate policy information and a token; and
    a gateway security filter module, operable by the processor, configured to:
    send the token to the TS client;
    establish a first secure channel between the gateway system and the TS server to transmit the policy information and token information from the gateway to the TS server, wherein the first secure channel does not involve the TS client and the TS client does not transmit the policy information to the TS server;
    deactivate the first secure channel; and
    subsequent to deactivating the first secure channel, establish a second secure channel between the TS client and the TS server to transmit data from the TS client to the TS server, wherein the transmitted data includes the token which is used by the TS server to identify the TS client and apply the policy information to the TS client such that the TS server takes action on subsequent data transmitted from the TS client to the TS server based on the policy information transmitted via the first secure channel.

12. The gateway system of claim 11, wherein the remote-operating protocol is Remote Desktop Protocol (RDP).

13. The gateway system of claim 11, wherein the policy information indicates enabling or disabling a feature that affects the TS client.

14. The gateway system of claim 13, wherein the feature is device redirection.

15. The gateway system of claim 13, wherein the feature is associated with at least one packet of the remote-operating protocol.

* * * * *

UNITED STATES PATENT AND TRADEMARK OFFICE
CERTIFICATE OF CORRECTION

PATENT NO.        : 8,201,218 B2               Page 1 of 1
APPLICATION NO.   : 11/680518
DATED             : June 12, 2012
INVENTOR(S)       : Meher P. Malakapalli et al.

It is certified that error appears in the above-identified patent and that said Letters Patent is hereby corrected as shown below:

In column 9, line 59, in Claim 5, delete "where" and insert -- wherein --, therefor.

Signed and Sealed this
Sixteenth Day of October, 2012

David J. Kappos
*Director of the United States Patent and Trademark Office*